United States Patent [19]

Shikiya et al.

[11] 4,033,197

[45] July 5, 1977

[54] TRANSMISSION FOR TRACTOR

[75] Inventors: Hajime Shikiya, Sennan; Seiichi Nakanishi, Sakai; Zitsuo Yoshida, Izumi; Kenkichi Hirakawa, Sakai, all of Japan

[73] Assignee: Kuboto Tekko Kabushiki Kaisha, Osaka, Japan

[22] Filed: Apr. 8, 1975

[21] Appl. No.: 566,119

[52] U.S. Cl. .................. 74/331; 74/344; 74/359; 74/360

[51] Int. Cl.² ............ F16H 3/22; F16H 3/30; F16H 3/32; F16H 57/02

[58] Field of Search ........... 74/325, 329, 331, 333, 74/342, 344, 352, 356, 357, 359, 360

[56] References Cited

UNITED STATES PATENTS

| | | | |
|---|---|---|---|
| 1,234,966 | 7/1917 | Thomas | 74/360 |
| 1,550,429 | 8/1925 | Daimler | 74/331 |
| 2,431,727 | 12/1947 | Bennett | 74/331 X |
| 2,500,308 | 3/1950 | Campodonico et al. | 74/331 |
| 3,080,773 | 3/1963 | Lee et al. | 74/331 X |
| 3,142,195 | 7/1964 | Henyon | 74/359 |
| 3,862,672 | 1/1975 | Tappen et al. | 74/325 X |

FOREIGN PATENTS OR APPLICATIONS

| | | | |
|---|---|---|---|
| 1,146,665 | 11/1957 | France | 74/333 |

*Primary Examiner*—Samuel Scott
*Assistant Examiner*—Carl F. Pietruszka
*Attorney, Agent, or Firm*—Edwin E. Greigg

[57] ABSTRACT

Transmission for tractors comprising an input shaft rotatably supported by a casing having means defining openings therein, a second speed change shaft disposed coaxially with the input shaft and rotatably supported at its opposite ends by further means defining openings in the casing, and speed change gears positioned outside the casing to operatively connect the input shaft and a first speed change shaft.

7 Claims, 5 Drawing Figures

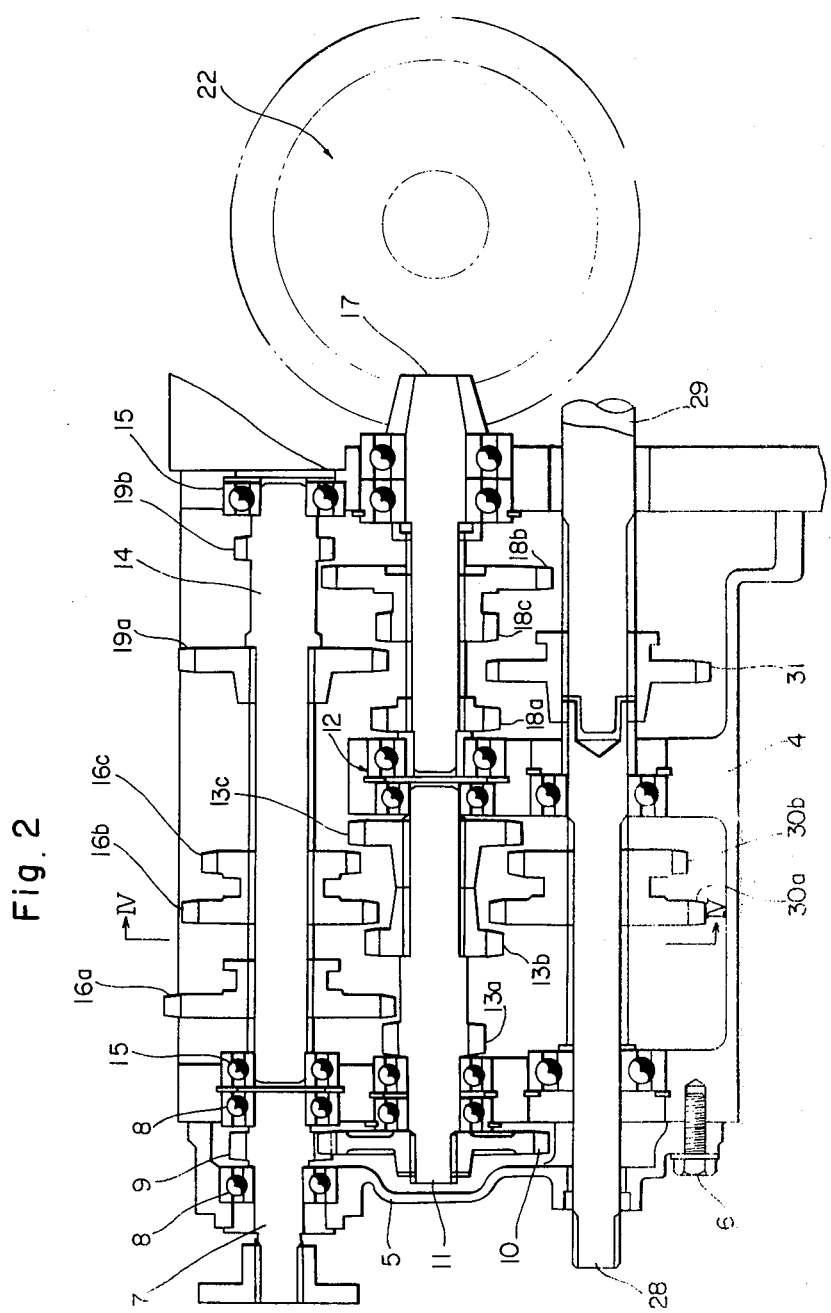

TRANSMISSION FOR TRACTOR

BACKGROUND OF THE INVENTION

The present invention relates to a transmission adapted to produce multistep speed changes for various tractors for use in agricultue, civil engineering or the like.

Transmissions for giving multistep speed variations require many speed change shafts, so that the speed change shafts must be ingeniously supported and housed in a casing. Accordingly, the input shaft for receiving the power from the prime mover is usually arranged coaxially with a second speed change shaft in end-to-end relation thereto, but the shaft supporting construction involves the following problems.

FIG. 5 shows an example of conventional transmissions in which an input shaft 7 is rotatably supported by casing 4, with a second speed shaft 14 disposed coaxially with the input shaft. The second speed change shaft 14 is fitted at its one end in a cavity 33 formed in the end of the input shaft 7 and is rotatably supported by the shaft 7. The other end of the shaft 14 is supported by the casing 4. With such structure, however, the support of the second speed change shaft 14 by the end of the input shaft 7 becomes very unstable, necessitating a boss portion 34 integral with the casing 4 so that an intermediate portion of the second speed change shaft 14 is supported by a bearing 35 mounted on the boss portion 34. Thus the conventional transmission requires provision of a very solid boss portion 34 which makes the casing 4 complex in construction, difficult to make and very heavy.

Furthermore, a transmission of the type described incorporates a speed change gear system including speed change gears 9 and 10 positoned closest to the prime mover to operatively connect the input shaft 7 to a first speed change shaft 11. It is generally practiced to replace these gears 9 and 10 to obtain a desired speed change, but great difficulties are encountered in replacing the gears 9 and 10 since both the gears 9 and 10 are positioned in the casing 4 according to the conventional structure shown in FIG. 5.

SUMMARY OF THE INVENTION

The present invention intends to overcome the foregoing drawbacks of conventional constructions and to provide a transmission in which the second speed change shaft can be reliably supported without the necessity of forming a boss portion on the casing and the speed change gears operatively connecting the input shaft to the first speed change shaft can be replaced with extreme ease.

The transmission of this invention for use in tractors comprises an input shaft 7 for receiving power from a prime mover 1, a first speed change shaft 11 spaced apart from the input shaft 7 and positioned in parallel thereto, a second speed change shaft 14 arranged coaxially with the input shaft 7 in end-to-end relation thereto, and a casing 4 provided with means defining openings carrying bearings rotatably suporting the input shaft 7 and the first and second speed change shafts 11 and 14, the input shaft 7 being operatively connected to the first speed change shaft 11 by speed change gears 9 and 10, the first speed change 11 being operatively connectable to the second speed change shaft 14 by speed change gears 13a, 13b, 13c and 16a, 16b, 16c, the input shaft 7 being positioned outside the casing 4 and having one end supported by a bearing in an opening in the casing 4, the second speed change shaft 14 having opposite ends supported by rotatably bearings in means defining openings in the casing 4, the speed change gears 9 and 10 for operatively connecting the input shaft 7 to the first speed change shaft 11 being positioned outside the casing 4.

Thus the construction in which the terminal ends of the second speed change shaft are supported by bearing carrying means defining openings in the casing assures a stable support for the second speed change shaft without a solid boss portion provided integrally with the casing. This serves to simplify the construction of the casing and to reduce the weight thereof.

Further, the speed change gears positioned outside the casing to operatively connect the input shaft to the first speed change shaft are readily replaceable without necessity of disassembling the casing.

An object of this invention is to provide a transmission which is adapted to produce multistep speed changes and which includes a casing of simple construction capable of ingeniously supporting and housing many speed change shafts.

Another object of this invention is to provide a transmission case which readily permits replacement of speed change gears to obtain a desired speed change.

Other objects and advantages will become apparent from the following description.

BRIEF DESCRIPTION OF THE DRAWINGS

FIG. 2 is a side elevation in vertical section showing a transmission;

DESCRIPTION OF THE PREFERRED EMBODIMENT

Figure 1:
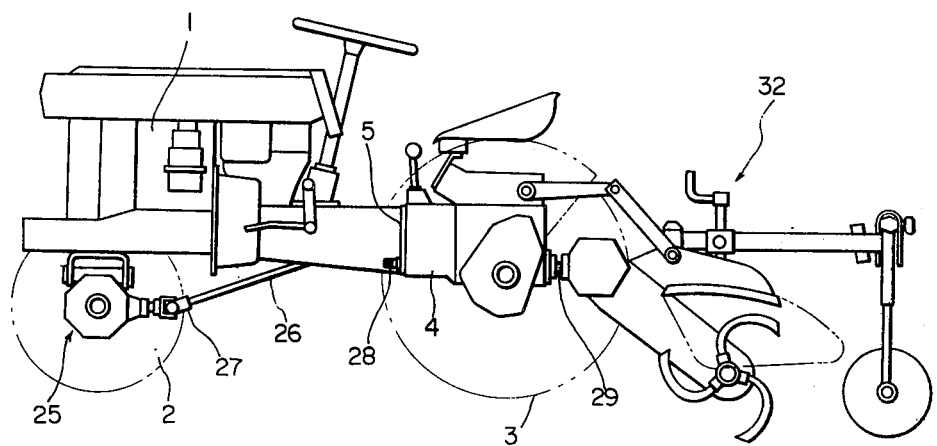
FIG. 1 is a schematic side elevation showing a tractor in its entirety.
Figure 3:
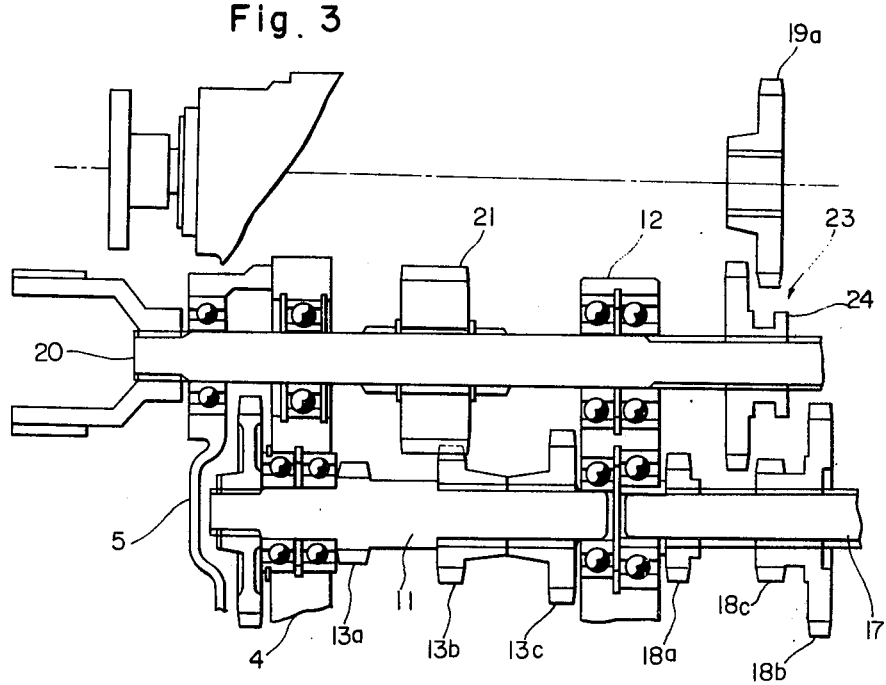
FIG. 3 is a development showing principle parts.
Figure 5:
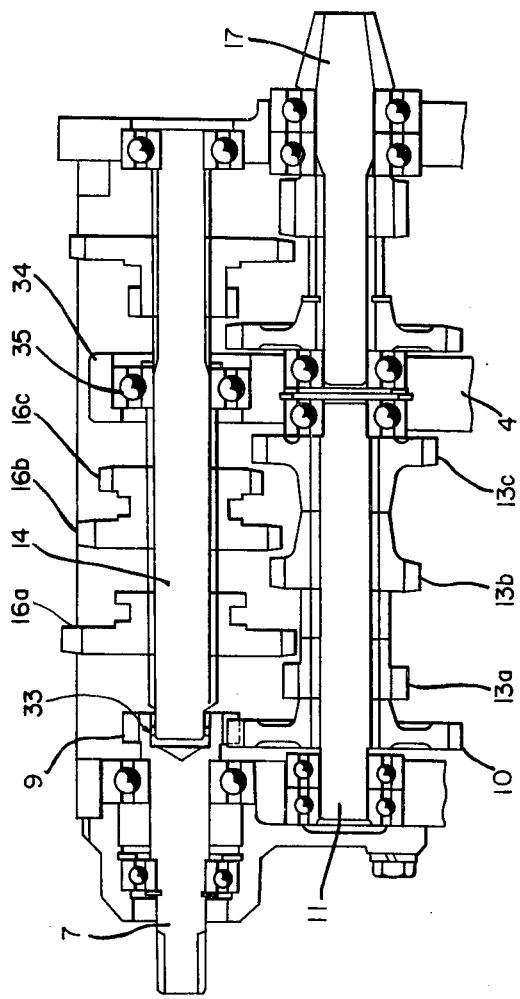
FIG. 5 is a side elevation in vertical section showing a conventional transmission.
Figure 4:
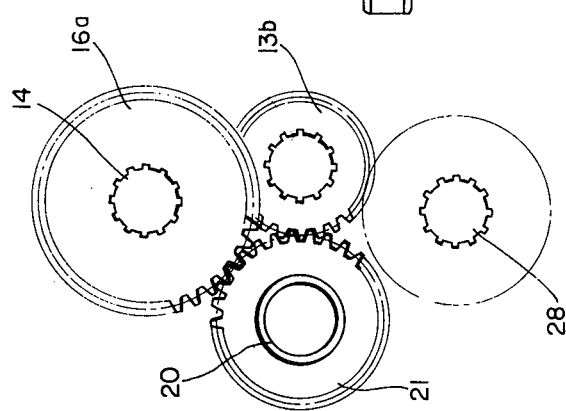
FIG. 4 is a view in section taken along the line IV—IV in FIG. 2.

An embodiment of this invention will be described in detail below with reference to the drawings. FIG. 1 shows a tractor which is propelled by four wheels. The tractor frame is provided, at its front portion, with a prime mover 1 and front wheels 2 and, at its rear portion, with rear wheels 3 and a casing 4 supporting the rear wheels 3.

A cover 5 is attached to the front wall of the casing 4 with bolts 6 in a readily removable manner. An input shaft 7 for receiving power from the prime mover 1 extends lognitudinally of the frame and is horizontally supported by the cover 5 and the front wall of the casing 4 by means of bearing 8 provided with means defining openings in the casing 4. The input shaft 7 is therefore rotatable, reliably supported by the cover 5 and the front wall of the casing 4 almost free of backlash. Power transmission is therefore effected with reduced vibrations.

A speed change gear 9 mounted on the input shaft 7 is positioned in the space between the front wall of the casing 4 and the cover 5. Inside the cover 5, a speed change gear 10 splined to a first speed change shaft 11 always meshes with the speed change gear 9. The first speed change shaft 11 extends between and is rotatably supported by a boss in the front wall of the casing 4 and a bearing support 12 provided approximately amidst the inner central portion of the casing 4. Speed changes gears 13a, 13b and 13c having different diameters are mounted on the first speed change shaft 11. The first speed change shaft 11 is mounted in spaced parallel relation with the input shaft 7.

A wider range of speed variation can be made available simply by replacing the speed change gears 9 and 10 with gears of different speed reduction ratio. This replacement work involves removal of bolts 6 and cover 5 only.

Disposed inside the casing 4 coaxially in end-to-end relation wih the input shaft 7 is a second speed change shaft 14 which is supported by the front and rear walls of the casing 4 in bearings 15 interposed between the shaft 14 and the walls respectively. Speed change gears 16a, 16b and 16c splined to the shaft 14 are shiftable to mesh with the corresponding speed change gears 13a, 13b and 13c respectively.

A third speed change shaft 17, disposed in the casing 4 coaxially with the first speed change shaft 11, is supported by the bearing support 12 and by means defining openings in the rear wall of the casing 4. The shaft 17 is provided with a speed change gear 18a fixedly mounted thereon and with speed change gears 18b and 18c integral with each other and slidably splined to the shaft 17. The end of the shaft 17 extending through the rear wall of the casing 4 has a gear for driving the rear wheels 3. Thus the rotation of the shaft 17 is suitably transmitted to the rear wheels 3 through the transmission mechanism.

A speed change gear 19a slidable to mesh with the speed change gear 18a is splined to the second speed change shaft 14. A speed change gear 19b meshable with the speed change gear 18b is fixedly mounted on the shaft 14.

A fourth speed change shaft 20 has a front end extending through a cover 5 and is supported by bearings in means defining opening respectively in the cover 5, and the front wall of the casing 4, and by bearing support 12 amidst the middle inside portion of the casing and by the rear wall of the casing. The fourth speed change shaft 20 is positioned in spaced and parallel relation with the first speed change shaft 11, the second speed change shaft 14 and the third speed change shaft 17 and in such a relation that a rotatable idler gear 21 mounted on shaft 20 is meshable with the gear 16b on the shaft 14 and with the gear 13b on the shaft 11 at the same time.

Accordingly, the rotation of the first speed change shaft 11 driven by the input shaft 7 which rotates at a specified speed is subjected to a multistep primary speed change by the selective meshing engagement between the speed change gears 16a, 16b, 16c and speed change gears 13a, 13b, 13c and between the idle gear 21 and the gears meshable therewith. The rotation of the first speed change gear is thus transmitted to the second speed change shaft 14.

By virtue of the selective engagement between the speed change gears 19a, 19b and the speed change gears 18a, 18b, the rotation of the second speed change gear 14 is subjected to a two-step auxiliary speed change involving high and low speeds and is thereby delivered to the third speed change shaft 17. The rotation of the third speed change shaft 17 is further transmitted to differential speed change means 22 to drive the rear wheels 3.

The fourth speed change shaft 20 is provided with a slidable coupling gear 24 meshable with a speed change gear 18c on the third speed change shat 17 by the operation of the shifter of shifting means 23.

The gear 24 is splined to the fourth speed change shaft 20. The end of the fourth speed change shaft 20 projecting forward from the casing 4 is operatively connected to a front wheel driving portion 25 at the front part of the tractor frame by a transmission rod 26 and universal joint means 27.

Through the operation of the shifting means 23, either a two-wheel propelling system or a four-wheel propelling system is selectively operable.

The primary speed change afforded by the speed change gears 16a, 16b and 16c included in the foregoing construction permits the input of the input shaft 7 to be eventually transmitted to the third speed change shaft 17 at six forward speeds and two reverse speeds as varied multi-stepwise.

The shifting means 23, when operated by the shifter, brings the third speed change shaft 17 into or out of operative engagement with the fourth speed change shaft 20.

Indicated at 28 and 29 in FIG. 2 are power takeoff shafts which are arranged coaxially with each other in the casing 4 and supported by bearings. The shaft 28 projects forward from the casing 4 and is provided with slidable change gears 30a and 30b meshable with the speed change gears 13b and 13c so as to rotatable with the shaft 11. The shaft 29 projects rearward and carries a slidable gear 31 meshable with the speed change gear 18c, the shaft 29 thus being made rotatable with the shaft 17 to drive a desired working implement 32.

The power takeoff shafts 28 and 29 are splined adjacent to their respective ends which contact each other and the gear 31 is mounted to slide over the splined portions. Thus, when the gear 31 comes into engagement with both the splined portions and with speed change gear 18a, the two power takeoff shafts 28 and 29 are rendered rotatable together.

What we claim is:

1. A transmission for a tractor comprising:
   an input shaft (7) to receive power from a prime mover (1),
   a first speed change shaft (11) spaced from and in parallel with the input shaft (7), the first speed change shaft (11) being adapted for operative connection to the input shaft (7) by means of removably mounted speed change gears (10, 9,)
   a second speed change shaft (14) disposed coaxially with the input shaft (7), the second speed change shaft (14) being adapted for operative connection to the first speed change shaft (11) by means of speed change gears (16a, 16b, 16c), (13a, 13b, 13c),
   a casing (4) having means defining openings to support the input shaft (7) and the first and second speed change shafts (11), (14) by means of bearings (8) respectively, the input shaft (7) and the second speed change shaft (14) being supported in the opening in spaced end-to-end relation, and
   a covering (5) adapted to extend over a side wall of the casing (4),
   and removably attached to the casing (4), the covering being provided with an outwardly extending deformed position serving to receive the terminal end portion of the first speed change shaft (11) and the gear (10) attached thereto, and to contain the input shaft (7) and its complemental speed change gear (9).

2. A transmission for a tractor according to claim 1, wherein the first speed change shaft (11) is provided with a power takeoff shaft rotatable therewith by means of the speed change gears (13b, 13c) and speed change gears (30a, 30b).

3. A transmission for a tractor according to claim 2, wherein the power takeoff shaft comprises two shafts (28) and (29) arranged coaxially with each other, the two shafts (28) and (29) being selectively rotatable with or independently of each other by a slidable gear (31), the shaft (29) being rotatable with a third speed change shaft (17) when rotating independently of the shaft (28).

4. A transmission for a tractor according to claim 3, wherein the third speed change shaft (17) is disposed coaxially with the first speed change shaft (11) and is rotatable with the second speed change shaft (14) by means of speed change gears (18a, 18b) and (19a, 19b) to transmit the power to rear wheels (3) through the third speed change shaft (17).

5. A transmission for a tractor according to claim 4, wherein a fourth speed change shaft (20) is spaced apart from and disposed in parallel relation with the first speed change shaft (11), the second speed change shaft (14) and the third speed change shaft (17), the fourth speed change shaft (20) being rotatable with the first speed change shaft (11) and with the second speed change shaft (14) by means of a rotatable idler gear (21) to change the direction of rotation of the second speed change shaft (14), the fourth speed change shaft (20) being rotatable with the third speed change shaft (17) by means of a gear (18a) and a gear (24) to transmit the power from the fourth speed change shaft (20) to front wheels (2) thrugh a coupling rod (26).

6. A transmission for a tractor according to claim 1, wherein a third speed change shaft (17) is disposed coaxially with the first speed change shaft (11) and is rotatable with the second speed change shaft (14) by means of speed change gears (18a, 18b) and (19a, 19b) to transmit the power to rear wheels (3) through the third speed change shaft (17).

7. A transmission for a tractor according to claim 1, wherein a fourth speed change shaft (20) is spaced apart from and disposed in parallel relation with the first speed change shaft (11), the second speed change shaft (14) and a third speed change shaft (17), the fourth speed change shaft (20) being rotatable with the first speed change shaft (11) and with the second speed change shaft (14) by means of a rotatable idler gear (21) to change the direction of rotation of the second speed change shaft (14), the fourth speed change shaft (20) being rotatable with the third speed change shaft (17) by means of a gear (18a) and a gear (24) to transmit the power from the fourth speed change shaft (20) to front wheels (2) of said tractor through a coupling rod (26).

* * * * *